United States Patent
Menezes et al.

(10) Patent No.: US 9,515,938 B2
(45) Date of Patent: Dec. 6, 2016

(54) SERVICE POLICIES FOR COMMUNICATION SESSIONS

(71) Applicant: Microsoft Technology Licensing, LLC, Redmond, WA (US)

(72) Inventors: Pascal F. Menezes, Bellevue, WA (US); Amer A. Hassan, Kirkland, WA (US); Jon Morrow, Snoqualmie, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 171 days.

(21) Appl. No.: 14/062,255

(22) Filed: Oct. 24, 2013

(65) Prior Publication Data
US 2015/0117198 A1 Apr. 30, 2015

(51) Int. Cl.
*H04L 12/813* (2013.01)
*H04L 12/851* (2013.01)
(Continued)

(52) U.S. Cl.
CPC ......... *H04L 47/20* (2013.01); *H04L 29/08576* (2013.01); *H04L 29/08585* (2013.01); *H04L 29/08819* (2013.01); *H04L 41/0893* (2013.01); *H04L 47/2433* (2013.01); *H04L 47/805* (2013.01); *H04L 67/14* (2013.01); *H04L 41/5009* (2013.01); *H04L 41/5022* (2013.01); (Continued)

(58) Field of Classification Search
CPC ...... H04L 12/5695; H04L 47/20; H04L 67/14; H04M 15/56; H04M 15/63; H04M 15/66
See application file for complete search history.

(56) References Cited

U.S. PATENT DOCUMENTS 7,181,532 B1 2/2007 Chan
7,701,882 B2 4/2010 Jones et al.
(Continued)

FOREIGN PATENT DOCUMENTS

EP 2343853 7/2011
WO WO-2010049002 5/2010

OTHER PUBLICATIONS

"Building a Unified Communications and Collaboration Environment that Supports Virtual Teams", retrieved from http://www.verizonbusiness.com/resources/whitepapers/wp_building-a-unified-communications-and-collaboration-environment-that-supports-virtual-teams_en_xg.pdf on Oct. 1, 2012, 12 pages.
(Continued)

*Primary Examiner* — Alpus H Hsu
(74) *Attorney, Agent, or Firm* — Tom Wong; Micky Minhas

(57) ABSTRACT

Techniques for service policies for communication sessions are described. According to various embodiments, a service policy specifies various rules and/or procedures for handling communication sessions. For instance, a service policy can specify service priority designations to be applied to communication sessions based on various attributes of the communication sessions. Techniques discussed herein provide for automated and dynamic management of service policies in a variety of communication scenarios, e.g., via per-session customization of service policies. In at least some embodiments, techniques may be employed to remedy problems that may occur during a communication session, such as via bandwidth reallocation, dynamic remapping of routing paths, and so forth.

20 Claims, 9 Drawing Sheets

(51) Int. Cl.
*H04L 29/08* (2006.01)
*G06F 15/16* (2006.01)
*H04L 12/24* (2006.01)
*H04L 12/927* (2013.01)
*H04M 15/00* (2006.01)
*H04L 12/707* (2013.01)
*H04L 12/26* (2006.01)
*H04L 29/06* (2006.01)

(52) U.S. Cl.
CPC ........ *H04L 41/5025* (2013.01); *H04L 41/5067* (2013.01); *H04L 43/087* (2013.01); *H04L 43/0829* (2013.01); *H04L 43/0864* (2013.01); *H04L 45/22* (2013.01); *H04L 65/1069* (2013.01); *H04M 15/66* (2013.01); *H04M 15/8228* (2013.01)

(56) References Cited

U.S. PATENT DOCUMENTS

| | | | | |
|---|---|---|---|---|
| 7,733,891 | B2* | 6/2010 | Reynolds | H04L 12/2602 370/412 |
| 7,930,158 | B2 | 4/2011 | Yemini et al. | |
| 7,974,212 | B2 | 7/2011 | Leung et al. | |
| 8,024,429 | B2* | 9/2011 | Cagenius | H04L 12/2834 370/235 |
| 8,151,321 | B2* | 4/2012 | Waris | H04L 41/0893 726/11 |
| 8,159,520 | B1* | 4/2012 | Dhanoa | H04N 7/148 348/14.02 |
| 8,300,575 | B2* | 10/2012 | Willars | H04L 47/10 370/328 |
| 8,346,225 | B2* | 1/2013 | Raleigh | H04W 12/08 370/230 |
| 8,369,238 | B2* | 2/2013 | Xu | H04L 41/5022 370/252 |
| 8,433,783 | B2* | 4/2013 | Jackowski | H04L 47/19 370/469 |
| 8,499,087 | B2* | 7/2013 | Hu | H04W 76/02 370/338 |
| 8,589,541 | B2* | 11/2013 | Raleigh | H04L 41/0893 455/405 |
| 8,612,612 | B1* | 12/2013 | Dukes | H04L 67/14 370/230 |
| 8,621,555 | B2* | 12/2013 | Zhou | H04L 12/14 726/1 |
| 8,676,187 | B2* | 3/2014 | Ionescu | H04W 8/183 380/233 |
| 8,792,491 | B2* | 7/2014 | Jackowski | H04L 69/32 370/389 |
| 8,831,041 | B2* | 9/2014 | Keith | H04L 47/2433 370/477 |
| 8,924,543 | B2* | 12/2014 | Raleigh | H04L 12/14 455/414.1 |
| 8,990,380 | B2* | 3/2015 | Jackowski | H04L 47/2475 709/202 |
| 9,106,513 | B2 | 8/2015 | Menezes et al. | |
| 9,197,559 | B1* | 11/2015 | Cloonan | H04L 47/10 |
| 2002/0062379 | A1* | 5/2002 | Widegren | H04L 29/06 709/227 |
| 2002/0083344 | A1 | 6/2002 | Vairavan | |
| 2002/0165949 | A1 | 11/2002 | Na et al. | |
| 2003/0131263 | A1 | 7/2003 | Keane et al. | |
| 2007/0078986 | A1 | 4/2007 | Ethier et al. | |
| 2008/0040306 | A1 | 2/2008 | Ma | |
| 2008/0089237 | A1 | 4/2008 | Molen et al. | |
| 2008/0137540 | A1 | 6/2008 | Botvich | |
| 2009/0028135 | A1 | 1/2009 | Mantripragada et al. | |
| 2009/0103524 | A1 | 4/2009 | Mantripragada et al. | |
| 2009/0190471 | A1* | 7/2009 | Mahendran | H04L 12/5695 370/230.1 |
| 2009/0285225 | A1 | 11/2009 | Dahod | |
| 2009/0327422 | A1 | 12/2009 | Katis et al. | |
| 2010/0220727 | A1 | 9/2010 | Zuk et al. | |
| 2010/0325551 | A1 | 12/2010 | Lauwers et al. | |
| 2011/0219134 | A1* | 9/2011 | Lidstrom | H04L 65/80 709/229 |
| 2011/0243144 | A1 | 10/2011 | Kwon et al. | |
| 2012/0117254 | A1 | 5/2012 | Ehrlich et al. | |
| 2012/0140624 | A1 | 6/2012 | Denman et al. | |
| 2012/0275323 | A1* | 11/2012 | Reznik | H04L 47/10 370/252 |
| 2012/0307687 | A1* | 12/2012 | Zhang | H04W 4/22 370/259 |
| 2013/0254412 | A1 | 9/2013 | Menezes et al. | |
| 2015/0085756 | A1* | 3/2015 | Sheth | H04W 8/205 370/329 |

OTHER PUBLICATIONS

"Cisco Virtualization Experience Infrastructure: Unify Virtual Desktops, Voice, and Video for the New Virtual Workspace", Retrieved from <http://www.cisco.com/en/US/solutions/collateral/ns340/ns517/ns224/ns836/solution_overview_c22-617932.html> on Aug. 1, 2013, Aug. 30, 2012, 13 pages.

"Unified Communications Managed API 3.0 Core SDK Documentation", retrieved from: http://msdn.microsoft.com/en-us/library/gg421023.aspx on Feb. 14, 2012, 2 pages.

"Avaya Unified Communications Management Controls Costs", retrieved from: http://www.avaya.com/mx/resource/assets/factsheet/Avaya_Unified_Communications_Management_Controls_Costs_fact_sheet.pdf on Oct. 1, 2012, 2 pages.

"Simply Connected for Unified Communications and Collaboration (UC&C) Reference Architecture", Retrieved from <http://www.juniper.net/us/en/local/pdf/reference-architectures/8030010-en.pdf>, Jul. 6, 2013, 24 pages.

"Ipanema Technologies", Retrieved from <http://www.ipanematech.com/wbNewsFront/newsDetail/id/135/wb_culture/en> on Aug. 1, 2013, Jan. 3, 2013, 3 pages.

"Cisco TelePresence Endpoints Running TC5 and Cisco Unified Communications Manager 8.6", Retrieved from <http://www.cisco.com/en/US/docs/telepresence/endpoint/codec-cseries/tc5/administration_guide/administering_endpoints_running_tc5_on_cucm8-6.pdf>, Jan. 2013, 33 pages.

"Unified Communications and Ip Telephony Solutions", Retrieved from <http://www.brocade.com/solutions-technology/enterprise/unified-communications/index.page> on Aug. 1, 2013, 4 Pages.

"Cisco SMB Switches", Retrieved from <http://www.cisco.com/en/US/prod/collateral/switches/ps10903/ps12128/c02-701025_prod_ov.pdf>, Oct. 21, 2012, 4 Pages.

"Cisco Prime Central for Hcs Assurance What's New", retrieved from: http://www.cisco.com/en/US/prod/collateral/netmgtsw/ps6491/ps12491/data_sheet_cs78-701989.pdf on Oct. 1, 2012, 2012, 4 pages.

"Benefits of Deploying Unified Communications on a Cisco Integrated Network", Retrieved from <http://www.cisco.com/en/US/prod/collateral/voicesw/ps6882/ps6884/solution_overview_c22-484573.html> on Aug. 2, 2013, Dec. 18, 2008, 8 pages.

"A Practitioner's Guide to More Efficient Network Management", Business White Paper, retrieved from: http://h10124.www.1.hp.com/campaigns/us/en/software/images/Practitioners_Guide.pdf on Oct. 1, 2012, 8 pages.

Gillman, "The Power of Collaboration within Unified Communications—Business Case Considerations for Improving Energy Industry Operations", retrieved from: http://www.touchbriefings.com/pdf/3199/gilman.pdf on Oct. 1, 2012, 4 pages.

Van "Unified Communication and Collaboration from the User's Perspective", retrieved from: http://www.ucstrategies.com/unified-communications-expert-views/unified-communication-and-collaboration-from-the-users-perspective.aspx on Dec. 8, 2009, 2 pages.

Zhang, et al.,' "QoEScope: Adaptive IP Service Management for Heterogeneous Enterprise Networks", retrieved from: http://www.nec-labs.com/~yueping/IWQoS09.pdf on Oct. 1, 2012; in the 17th International Workshop on Quality of Service, IWQoS, Jul. 13, 2009, 5 pages.

(56) References Cited

OTHER PUBLICATIONS

"Notice of Allowance", U.S. Appl. No. 13/428,883, Apr. 15, 2015, 11 pages.
"3rd Generation Partnership Project; Technical Specification Group Services and System Aspects; Policy and Charging Control Architecture (Release 12)", 3GPP TS 23.203 v12.20, Sep. 30, 2013, 204 Pages.
"Final Office Action", U.S. Appl. No. 13/428,883, Dec. 23, 2014, 29 Pages.
"International Search Report and Written Opinion", Application No. PCT/US2014/061656, Feb. 2, 2015, 13 Pages.
Grossman, "New Terminology and Clarification for Diffserv", Apr. 1, 2002, 11 Pages.
"Non-Final Office Action", U.S. Appl. No. 13/428,883, Aug. 29, 2014, 22 pages.
"Second Written Opinion", Application No. PCT/US2014/061656, Sep. 29, 2015, 7 pages.
"International Preliminary Report on Patentability", Application No. PCT/US2014/061656, Jan. 14, 2016, 8 pages.

* cited by examiner

SERVICE POLICIES FOR COMMUNICATION SESSIONS

BACKGROUND

Modern communication systems have an array of capabilities, including integration of various communication modalities with different services. For example, instant messaging, voice/video communications, data/application sharing, white-boarding, and other forms of communication may be combined with presence and availability information for subscribers. Such systems may provide subscribers with the enhanced capabilities such as providing instructions to callers for various status categories, alternate contacts, calendar information, and comparable features. Furthermore, collaboration systems enabling users to share and collaborate in creating and modifying various types of documents and content may be integrated with multimodal communication systems providing different kinds of communication and collaboration capabilities. Such integrated systems are sometimes referred to as Unified Communication and Collaboration (UC&C) systems.

While UC&C systems provide for increased flexibility in communications, they also present a number of implementation challenges.

For instance, a UC&C system typically supports multiple communication modalities via a single connection, e.g., voice, video and data converged over a single interface. Challenges thus arise in implementing quality of service polices for the different modalities. Further, UC&C is typically implemented via software that can be loaded on mobile devices, e.g., tablets, smartphones, laptops, and so forth. Thus, techniques for managing UC&C communication traffic typically have to be fluid and dynamic to accommodate changing connection scenarios.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for service policies for communication sessions are described. According to various embodiments, a service policy specifies various rules and/or procedures for handling communication sessions. For instance, a service policy can specify service priority designations to be applied to communication sessions based on various attributes of the communication sessions. A service policy may also specify bandwidth allocations for different communication sessions, such as based on as service priority for a communication session, a type of media included in a communication session, and so on. Techniques discussed herein provide for automated and dynamic management of service policies in a variety of communication scenarios, e.g., via per-session customization of service policies. In at least some embodiments, techniques may be employed to remedy problems that may occur during a communication session, such as via bandwidth reallocation, dynamic remapping of routing paths, and so forth.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
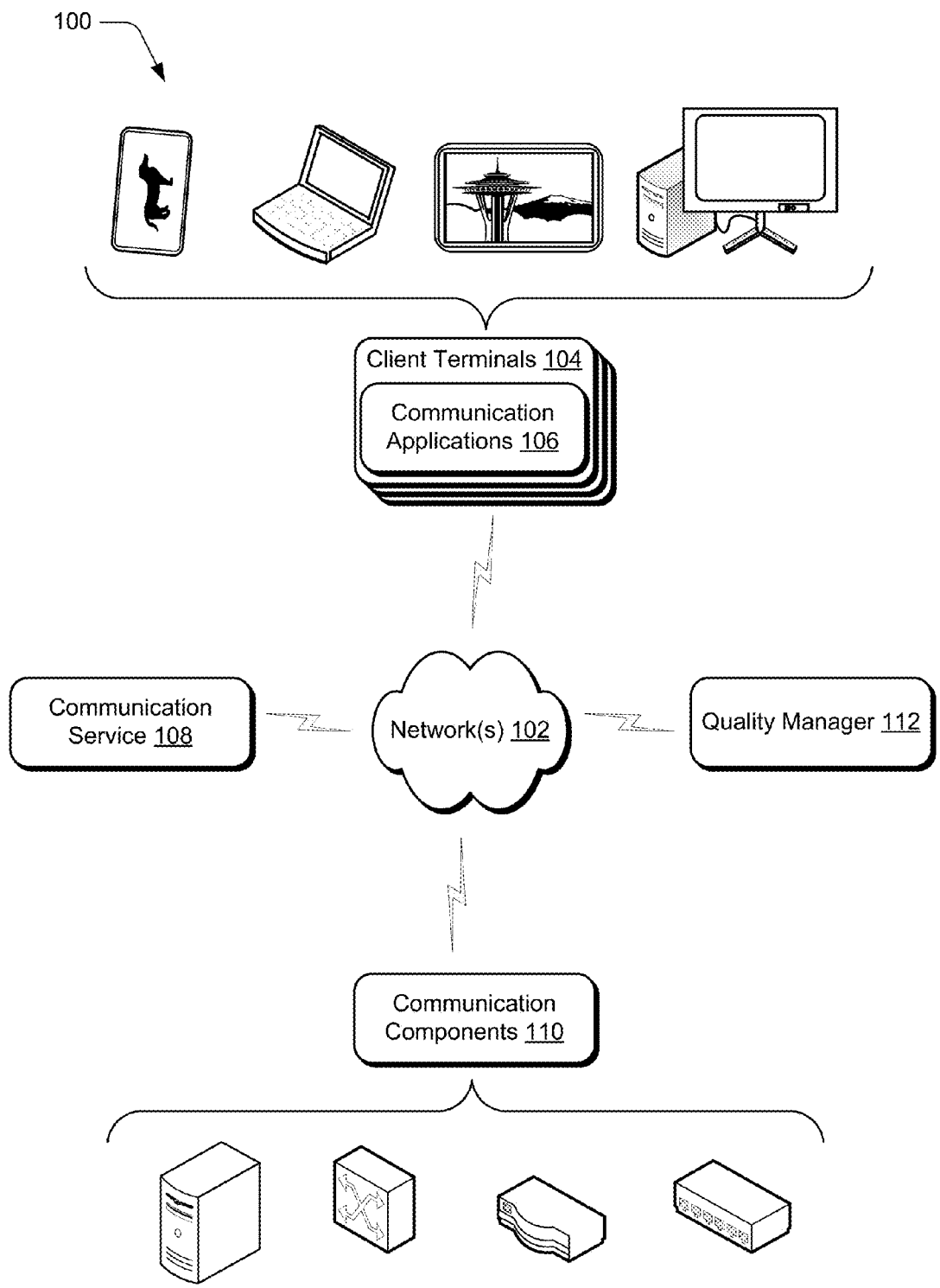
FIG. 1 is an illustration of an environment in an example implementation that is operable to employ techniques discussed herein.

Techniques for service policies for communication sessions are described. In at least some embodiments, a communication session refers to an exchange of communication data between different nodes in a network. Examples of a communication session include a Voice over Internet Protocol (VoIP) call, a video call, text messaging, a file transfer, and/or combinations thereof. In at least some embodiments, a communication session represents a Unified Communication and Collaboration (UC&C) session.

According to various embodiments, a service policy specifies various rules and/or procedures for handling communication sessions. For instance, a service policy can specify service priority designations to be applied to communication sessions based on various attributes of the communication sessions. Generally, service priority designations refer to different priorities that can be assigned to different types of data. Examples of service priority designations include class of service (CoS) designations, quality of service (QoS) designations, and so forth. For instance, communication data tagged with a high service priority may be given higher priority treatment in terms of access to network resources (e.g., bandwidth) than communication data tagged with a low service priority.

A service policy may also specify bandwidth allocations for different communication sessions, such as based on as service priority for a communication session, a type of media included in a communication session, and so on. Thus, service policies can be employed to manage a variety of different aspects of data flow in a communication session.

Techniques discussed herein provide for automated and dynamic management of service policies in a variety of communication scenarios. For instance, consider an example implementation scenario where a VoIP call is initiated in a communication network. Various components of the communication network (e.g., routers, switches, and so forth) can be pre-configured with a set of initialization service policies that apply to communication data that is handled by the components. The initialization policies, for instance, can specify that communication data is to be initially tagged with a particular service priority, regardless of a type of media included in the communication data or a pre-existing service priority designation for the communication data. Accordingly, media data for the VoIP call is initially tagged with the particular service priority, and is thus handled based on the particular service priority.

Continuing with the example scenario, the VoIP call is determined to be entitled to a higher service priority. Quality management functionality, for example, can determine that one or more participating devices in the VoIP call are authenticated to receive a higher service priority, and/or that a data type included in the VoIP call data is entitled to a higher service priority. Accordingly, updated service policies are generated for the VoIP call that specify that data for the VoIP call is to be tagged with a higher service priority. The updated service policies are propagated to various components of the communication network to be used in handling the VoIP call data. In at least some embodiments, the updated service policies are transmitted separately (e.g., out of band) from the VoIP call data. The updated service policies, for instance, override some or all of the initialization service policies with regard to handling the particular VoIP call.

As described in more detail below, the updated service policies can be tied to the particular VoIP call, such as via identifiers for client devices involved in the call session. Thus, the updated service policies can be applied to data for the VoIP call, but not to data for a different communication session. Thus, techniques discussed herein provide for per-session customization of service policies. This prevents unauthorized (e.g., unauthenticated) data flows from being tagged with service priorities to which they are not entitled.

In at least some embodiments, techniques discussed herein can be employed to remedy problems that may occur during a communication session. Examples of such problems include packet loss, jitter, packet delay, and so forth. For instance, techniques can enable additional bandwidth to be allocated for a communication session. Additionally or alternatively, techniques can remap a routing path for a communication session to avoid (e.g., circumvent) a particular network component that is causing a problem.

In the following discussion, an example environment is first described that is operable to employ techniques described herein. Next, a section entitled "Example Implementation Scenarios" describes some example implementation scenarios in accordance with one or more embodiments. Following this, a section entitled "Example Procedures" describes some example procedures in accordance with one or more embodiments. Finally, a section entitled "Example System and Device" describes an example system and device that are operable to employ techniques discussed herein in accordance with one or more embodiments.

Having presented an overview of example implementations in accordance with one or more embodiments, consider now an example environment in which example implementations may by employed.

Example Environment

FIG. 1 is an illustration of an environment 100 in an example implementation that is operable to employ techniques for service policies for communication sessions described herein. The environment 100 includes a communication network 102, which is representative of different connected components that exchange, process, and/or route data to enable different forms of communication. The network 102, for example, enables transmission and receipt of voice data, video data, content data, and so forth. In at least some embodiments, the network 102 represents a Unified Communication and Collaboration (UC&C)-enabled network.

Connected to the network 102 are client terminals 104, which are representative of end-user devices that communicate via the network 102. The client terminals 104 may be configured in a variety of ways, such as a traditional computer (e.g., a desktop personal computer, laptop computer, and so on), a mobile station, an entertainment appliance, a smartphone, a netbook, a game console, a handheld device (e.g., a tablet), and so forth.

The client terminals 104 include communication applications 106, which are representative of functionalities to enable different forms of communication via the client terminals 104. Examples of the communication applications 106 include a voice communication application (e.g., a VoIP client), a video communication application, a messaging application, a content sharing application, and combinations thereof. The communication applications 106, for instance, enable different communication modalities to be combined to provide diverse communication scenarios. In at least some embodiments, the communication applications 106 represent applications that are installed on the client terminals 104. Additionally or alternatively, the communication applications 106 can be implemented as remote applications, such as accessed via a web browser, a web application, and so forth.

The environment 100 further includes a communication service 108, which is representative of a service to perform various tasks for management of communication between the client terminals 104 and/or other entities connected to the network 102. The communication service 108, for instance, can manage initiation, moderation, and termination of communication sessions between the client terminals 104. Examples of the communication service 108 include a VoIP service, an online conferencing service, a UC&C service, and so forth. The communication service 108 may be implemented as or be connected to a private branch exchange (PBX) in communication with a Public Switched Telephone Network ("PSTN") to enable voice communication between the client terminals 104. In at least some embodiments, the client terminals 104 are configured to interface with the communication service 108 via the communication applications 106 to enable communication between the different client terminals 104. Further functionalities and implementations of the communication service 108 are discussed below.

Further illustrated are communication components 110, which are representative of functionalities to perform different communication-related tasks for the network 102. Examples of the communication components 110 include servers, routers, network switches, network elements (NEs), and so on. The communication components 110, for instance, can receive communications from the client terminals 104, process the communications, and route the communications to the appropriate location(s). Thus, the communication components 110 represent a hardware and logical infrastructure for routing communications to different nodes of the network 102.

The environment 100 also includes a quality manager 112, which is representative of functionality to control various quality-related service policies for communication in the network 102. The quality manager 112, for instance, can configure and propagate service policies to the different communication components 110 and/or other entities of the network 102. The quality manager 112 is further configured to dynamically update service policies, and to propagate updated service policies to the communication components 110. The quality manager 112 also enables dynamic configuration and reconfiguration of communication paths within the network 102 and/or other network, such as to accommodate changes in network connections.

According to one or more embodiments, the quality manager 112 includes connectivity and logic that accesses routing information for the network 102. For instance, the quality manager 112 can access an Interior Gateway Protocol (IGP) and/or spanning tree switching topology for the network 102. This enables the quality manager 112 identify different data routing paths within the network 102, such as between the client terminals 104 and the communication components 110. The quality manager 112 may also map and remap communication paths between various components of the network 102, such as to optimize and/or repair communication sessions in the network 102.

The ability to interface with the communication components 110 and other nodes of the network 102 enables the quality manager 112 to configure and reconfigure service policies for communication within the network 102 and/or other connected network. Generally, service policies enable attributes to be specified for communication within the network 102, such as via traffic shaping, packet prioritization, application classification, and so forth. Further details concerning the quality manager 112 and service policies in general are described below.

Having described an example environment in which the techniques described herein may operate, consider now some example implementation scenarios for service policies for communication sessions in accordance with one or more embodiments.

Example Implementation Scenarios

The following section describes example implementation scenarios for service policies for communication sessions in accordance with one or more embodiments.

Figure 2:
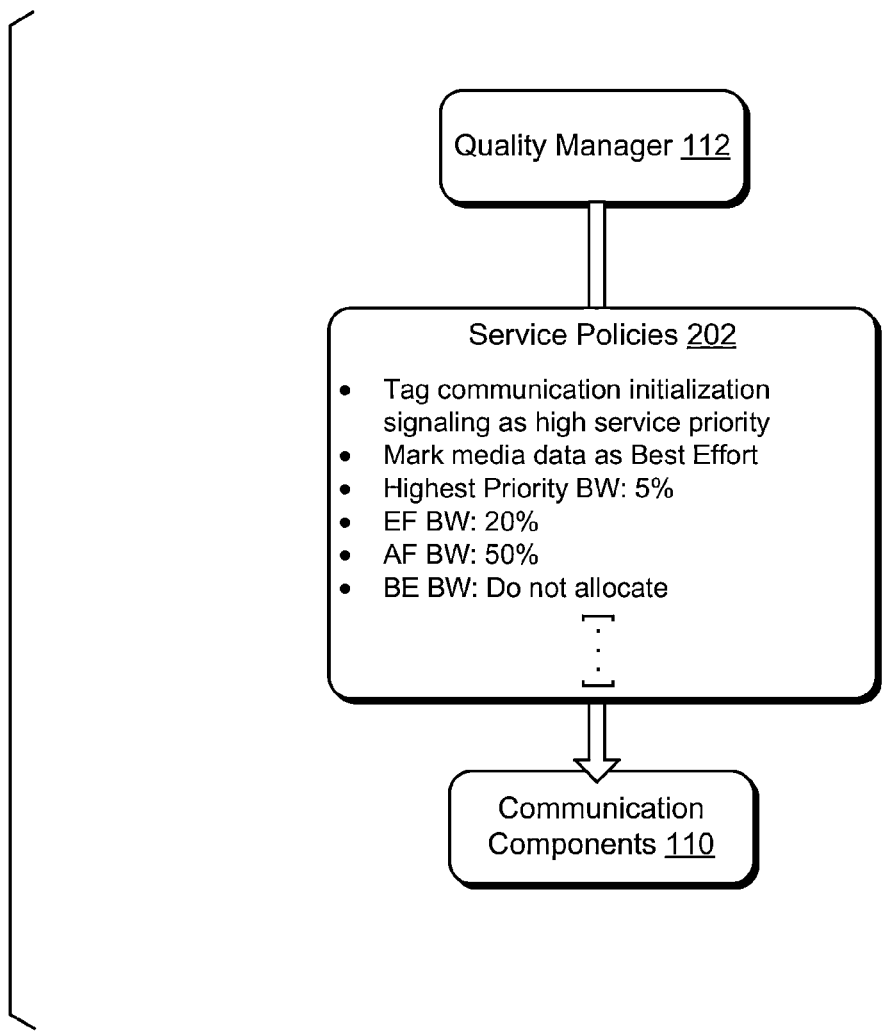
FIG. 2 illustrates an example implementation scenario in accordance with one or more embodiments.

FIG. 2 illustrates an example implementation scenario for propagating service policies to different network entities, generally at 200. The scenario 200 includes the quality manager 112, introduced above.

Further to the scenario 200, the quality manager 112 generates service policies 202, and propagates the service policies to the communication components 110. The service policies 202, for example, can be pushed to and/or pulled by the communication components 110. In at least some embodiments, the service policies 202 represent initialization service policies, which are applied to data of a communication session when the communication session is initiated.

According to various embodiments, the service policies 202 specify how different types of communication data are to be handled by the communication components 110. The service policies 202, for example, specify different classes of service to be applied to different types of data, different bandwidth allocations for different types and classes of data, and so forth. In at least some embodiments, the service policies 202 specify policy and priority to be applied for a data packet when traversing a hop in the network 102, such as individual of the communication components 110. The policies listed as part of the service policies 202 are presented for purpose of example only, and a variety of other policies not expressly listed can be specified in accordance with the disclosed embodiments.

Examples of service priorities that can be applied to communication data by the service policies 202 and/or other service policies include:

(1) Class Selector 3 (CS3). In at least some embodiments, this refers to a highest service priority.

(2) Expedited Forwarding (EF). This class is typically dedicated to low-loss, low-latency traffic such as voice data, video data, and so forth. In at least some embodiments, EF is a high service priority.

(3) Assured Forwarding (AF). This class typically provides assurance of packet delivery as long as packet traffic does not exceed a specified rate. In at least some embodiments, AF does not provide latency attributes specified for EF packets and/or is a lower service priority than EF and CS3.

(4) Best Effort (BE). This class typically does not guarantee data delivery or provide a specific service priority, e.g., with respect to packet loss, packet latency, and so forth. QoS for BE packets typically depends on packet traffic load in a particular portion of a network, and is typically prioritized behind CS3, EF, and AF packets.

These service priorities are presented for purpose of example only, and embodiments may employ other class designators and classes of service without departing from the spirit and scope of the disclosed embodiments.

In this particular implementation, the service policies 202 specify that communication initialization signaling is to be tagged as a high service priority, e.g., CS3. Generally, communication initialization signaling refers to data included as part of a request to initiate communication between two or more client devices, e.g., two or more of the client terminals 104 introduced above.

The service policies 202 further specify that media data is to be tagged as a lower service priority, e.g., BE service priority. Generally, media data refers to content included as part of a communication, such as voice data, video data, content data, and so forth. For instance, communication initiation signaling can be used to initiate a communication session between devices. After the communication session is established, media data can be exchanged as part of the communication session.

Bandwidth allocations (BW) are also specified by the service policies 202. In this example, the service policies 202 specify discrete bandwidth percentages to be allocated for routing data according to particular service priorities. The bandwidth values, for example, specify a particular percentage of bandwidth to be utilized by an egress link scheduler for routing data from the communication components 110. These bandwidth allocations are presented for purpose of example only, and a variety of other allocation amounts, units, and so forth, may be employed.

Thus, the communication components 110 are configured with the service policies 202 and can utilize the service policies 202 to handle various types of communication data. In at least some embodiments, the scenario 200 represents an initial setup of the communication components 110 by the quality manager 112.

Figure 3:
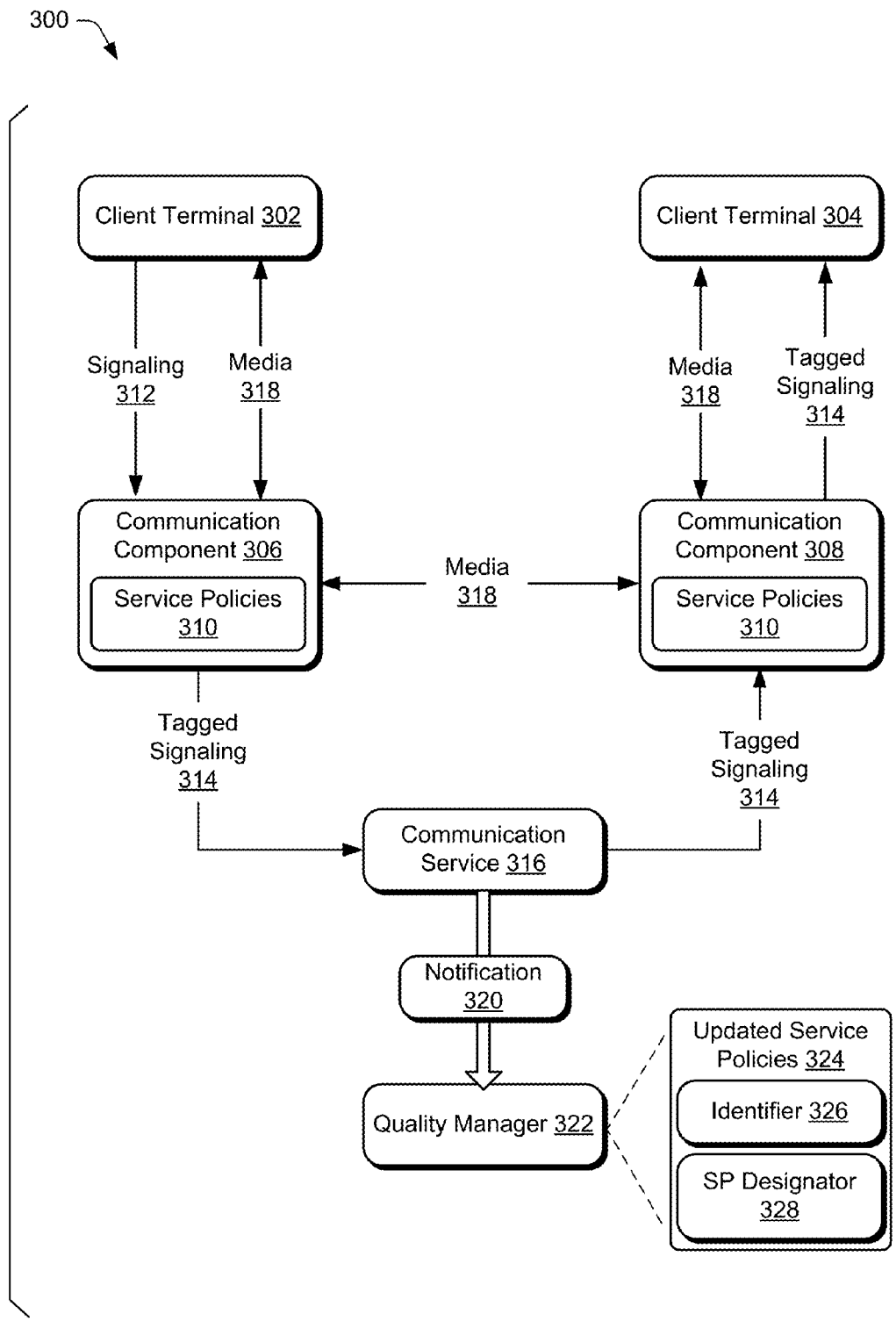
FIG. 3 illustrates an example implementation scenario in accordance with one or more embodiments.

FIG. 3 illustrates an example implementation scenario for initiating a communication session, generally at 300. The scenario 300 includes a client terminal 302 and a client terminal 304, which are associated via a network. The client terminals 302, 304, for example, represent implementations of the client terminals 104 introduced above. The scenario 300 also includes a communication component 306 and a communication component 308, which represent implementations of the communication components 110 introduced above. The communication components 306, 308 are configured with service policies 310, such as discussed above with reference to FIG. 2. The service policies 310, for instance, represent initialization service policies that are applied at the initiation of a communication session.

Further to the scenario 300, the client terminal 302 generates communication initiation signaling 312, which represents a request to initiate a communication session with the client terminal 304. For instance, a communication application of the client terminal 302 (e.g., an instance of the communication applications 106) can initiate the request. The signaling 312 includes information about the requested communication session, such as an address (e.g., IP address) for the client terminal 302, an address for the client terminal 304, a type of communication session being requested (e.g., a type and/or types of media involved), and so forth.

The signaling 312 is received by the communication component 306, which applies one or more of the service policies 310 to the signaling 312. For instance, the communication component 306 marks the signaling 312 with a high service priority (such as CS3 referenced above) to generate tagged signaling 314. A packet header in the tagged signaling 314, for example, is tagged with a service priority designator for the high service priority.

Continuing with the scenario 300, the tagged signaling 314 is routed from the communication component 306 to a communication service 316, which represents an implementation of the communication service 108 introduced above. The communication service 316 identifies the client terminal 304 in the tagged signaling 314, and routes the tagged signaling to the client terminal 304 via the communication component 308. The communication component 308 ascertains that the tagged signaling is tagged with the high service priority, and thus routes the tagged signaling 314 to the client terminal 304 according to the higher service priority. For instance, the communication component 308 allocates bandwidth to the tagged signaling 314 based on the service policies 310, which specify bandwidth allocation for the high service priority.

Based on the tagged signaling 314, a communication session is initiated between the client terminal 302 and the client terminal 304 via the exchange of a communication media flow 318. The media flow 318 is representative of a sequence of data packets that include one or more types of media data, such as audio (e.g., voice data), video, and/or other types of content.

Based on the service policies 310, the media flow 318 is tagged as BE service priority. In at least some embodiments, if the media flow 318 is not tagged or is already tagged with a particular service priority different than BE (e.g., by the client terminal 302), the media flow is tagged or retagged by the communication component 306 and/or the communication component 308 as BE. Thus, bandwidth allocation and/or other data routing policies of the service policies 310 that pertain to the BE service priority are applied to the media flow 318 when routing the media flow 318 between the client terminal 302 and the client terminal 304.

In at least some embodiments, the communication component 306 and/or the communication component 308 tag the media flow 318 as BE without inspecting the content of the media flow 318. Thus, the media flow 318 can be tagged with a particular service priority by a communication component without the communication component being aware of the type and/or nature of the media content in the media flow 318. For instance, a header for data packets of the media flow 318 may simply identify the media flow as including content, e.g., as being distinguished from signaling data. The media flow 318, for example, may be encrypted. Thus, a communication component can tag the media flow 318 with a particular service priority without decrypting and/or deciphering its content.

Further to the scenario 300, the communication service 316 provides a notification 320 to a quality manager 322 that indicates that a communication session has been initiated between the client terminals 302, 304. In at least some embodiments, the notification 320 is separate (e.g., out of band) from the tagged signaling 314 and the media flow 318.

The notification 320 includes attributes of the communication session, such as a date/time stamp for the communication session, an identifier for the communication session, a media type or types for the media flow 318, and so forth. In at least some embodiments, an identifier for the communication session includes 5-tuple information that describes attributes of the communication session. The 5-tuple information, for instance, includes an address for the client terminal 302 (e.g., source address), an address for the client terminal 304 (e.g., destination address), a port on the client terminal 302 being used for the communication session (e.g., a source port), a port on the client terminal 304 being used for the communication session (e.g., a destination port), and a transport protocol being used for the communication session, e.g., transmission control protocol (TCP).

The notification 320 may also include an indication that the client terminal 302 and/or the client terminal 304 are authenticated, e.g., that the client terminal (e.g., a user associated with a particular client terminal) is authorized to initiate and/or participate in a communication session via the communication service 316.

Based on the notification 320, the quality manager 322 generates updated service policies 324 for communication between the client terminal 302 and the client terminal 304, e.g., for the media flow 318. The updated service policies 324 include an identifier 326 for the communication session (e.g., the 5-tuple referenced above) and a new service priority designator 328 for the media flow 318. The updated service policies 324 may include other updated policies, such as updated bandwidth allocations for different service priorities, updated routing information for the media flow 318 (e.g., an updated routing path), and so forth.

In at least some embodiments, the service priority designator 328 is determined based on a media type for the media flow 318. For instance, voice data (e.g., as part of a VoIP call) and live video data may be designated with a high service priority, such as EF. Other types of data, such as content data, files, and so forth, may be tagged with a lower (e.g., mid-level) service priority, such as AF. Thus, different types and/or modalities of media may be designated with different service priorities.

According to one or more embodiments, service policies discussed herein can specify different service priorities based on various considerations, such as user priority, modality priority, device priority, and so forth. For instance, a communication session involving a high priority user may be designated with a higher service priority than a communication session for a lower priority user. Thus, service priority for communication session data can be specified based on a variety of different considerations.

Figure 4:
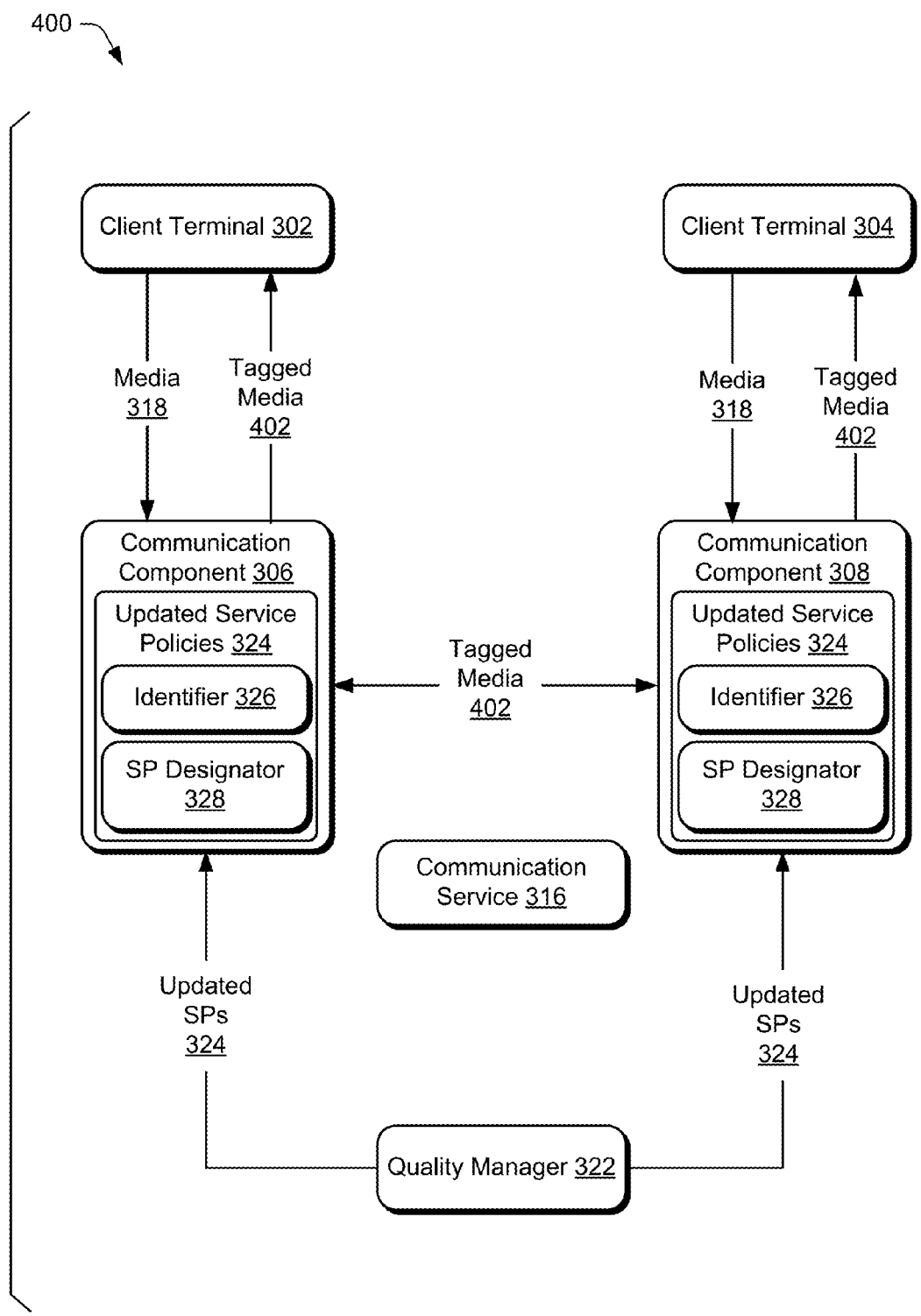
FIG. 4 illustrates an example implementation scenario in accordance with one or more embodiments.

FIG. 4 illustrates an example implementation scenario for remapping service policies, generally at 400. In at least some embodiments, the scenario 400 represents a continuation of the scenario 300 discussed above.

In the scenario 400, the quality manager 322 identifies the various communication components involved in transferring the media flow 318 between the client terminals 302, 304, e.g., the communication components 306, 308. As discussed above, the quality manager 322 has access to topology for the particular network(s) involved in a communication session, and thus is able to identify components involved in various transactions within the network(s).

The quality manager 322 pushes the updated service policies 324 to the communication components 306, 308, as well as to other components involved in handling the media flow 318. For instance, the quality manager 322 pushes the updated service policies 324 to ingress switches involved in routing of the media flow 318. Alternatively or additionally, the updated service policies can be pulled by one or more components from the quality manager 322. According to one or more embodiments, the updated service policies 324 are pushed to the various components separate (e.g., out of band) from the media flow 318 and/or other communication between the client terminals 302, 304.

Thus, the communication components 306, 308 are configured with the updated service policies 324. The service policies 310, for example, are replaced and/or reconfigured with the updated service policies 324.

Based on the updated service policies 324, the communication component 306 and/or the communication component 308 identify the media flow 318 based on the identifier 326 (e.g., the 5-tuple), and retag the media flow 318 with the service priority designator 328 to generate tagged media flow 402. The media flow 318, for instance, is retagged from BE to a higher service priority (e.g., AF, EF, and so forth) to generate the tagged media flow 402. The tagged media flow 402 is routed and/or processed by the communication components 306, 308 based on the service priority designator 328. For instance, bandwidth is allocated to the tagged media flow 402 based on the service priority designator 328.

As referenced above, the updated service policies 324 may include updated bandwidth allocations for different service priorities. Thus, the communication components 306, 308 can apply the updated bandwidth allocations to the tagged media flow 402 and other media flows that pass through the communication components.

In at least some embodiments, when the communication session between the client terminals 302, 304 is complete, the updated service policies 324 are removed from the communication components 306, 308. For instance, an End Dialog event can be sent to the communication components 306, 308 indicating that the communication session, and thus the tagged media flow 402, is terminated. In response, the communication components 306, 308 can delete the updated service policies 324. Additionally or alternatively, an aging function can also be implemented such that the updated service policies 324 are deleted if no communication traffic between the client terminals 302, 304 is detected after a specified period of time has elapsed. Thus, if the End Dialog event is lost, invoking the aging function can nonetheless enable the updated service policies 324 to be deleted.

Accordingly, the scenario 400 illustrates that service policies can be dynamically updated and propagated to various network entities, and that media flows can be tagged and retagged (e.g., dynamically and on-the-fly) with different service priority designations.

In at least some embodiments, techniques discussed herein can be employed to handle problems that may occur during a communication session. For instance, consider the following.

Figure 5:
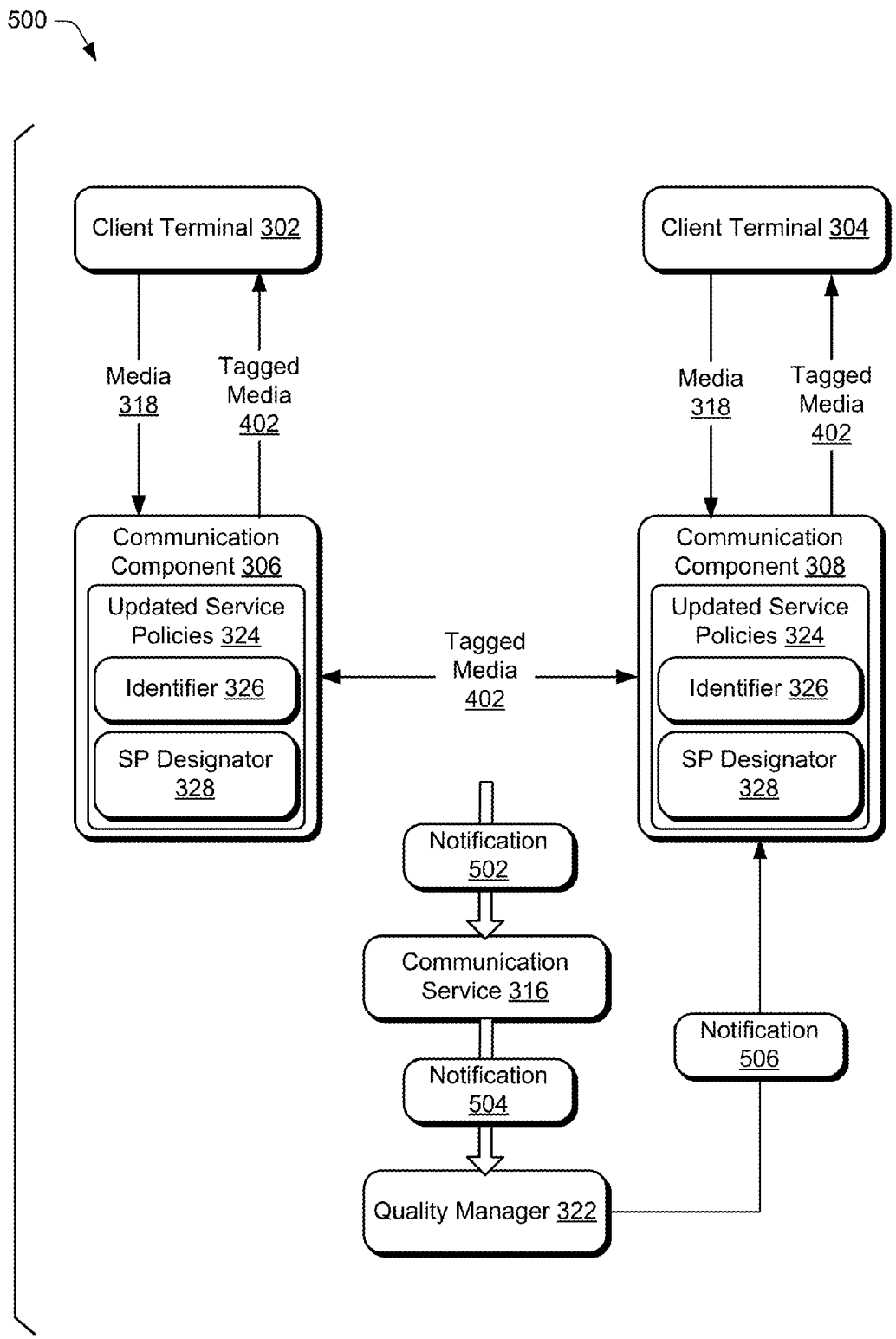
FIG. 5 illustrates an example implementation scenario in accordance with one or more embodiments.

FIG. 5 illustrates an example implementation scenario for handling problems that may occur during a communication session, generally at 500. In at least some embodiments, the scenario 500 represents a continuation of the scenario 400 discussed above.

In the scenario 500, the communication service 316 receives a notification 502 of a problem in the tagged media flow 402. The notification 502, for example, indicates one or more problems with the tagged media flow 402, such as dropped packets, excess jitter and/or packet delay, and so forth. The notification 502 can be sent to the communication service 316 by any suitable entity, such the communication components 306, 308, one of the client terminals 302, 304, and/or other entity involved in the communication session.

In response to receiving the notification 502, the communication service 316 notifies the quality manager 322 of the problem via a notification 504. The notification 504, for example, can include a Bad Session notification that identifies the problem, such as dropped packets, excess jitter and/or packet delay, and so forth. In response to receiving the notification 504, the quality manager 322 determines a location or locations where the problem is occurring and/or initiating. As discussed above, the quality manager 322 knows the routing path for the tagged media flow 402, and thus can ascertain settings and performance attributes (e.g., packet ingress and egress rates) for different components involved in the routing path.

Further to the scenario 500, the quality manager 322 determines that the problem is occurring at the communication component 308. The quality manager 322, for instance, determines that packets are being dropped by the communication component 308, that excess packet jitter and/or packet delay is occurring at the communication component 308, and/or other media flow-related problem(s).

In this particular example scenario, the quality manager 322 determines that an amount of bandwidth allocated for the tagged media flow 402 is insufficient. Thus, the quality manager 322 determines one or more ways of dealing with the problem. For instance, the quality manager 322 emits a notification 506 to the communication component 308, which instructs the communication component 308 to increase its bandwidth allocation for the tagged media flow 402. The notification 506, for example, instructs the communication component 308 to increase its bandwidth allocation for the service priority designated for the tagged media flow 402. Increasing the bandwidth allocation increases packet throughput of the communication component 308, and thus may lessen or eliminate the problem with the tagged media flow 402.

In at least some embodiments, the notification 506 can include an update or a replacement for a service policy of the communication component 308. The notification 506, for instance, can include a bandwidth reallocation that allocates additional bandwidth for the service priority designated for the tagged media flow 402.

As an alternative or addition to the notification 506 to the communication component 308, the quality manager 322 can reconfigure a routing path for the tagged media flow 402. For instance, the quality manager 322 can identify one or more other communication components that are available to route the tagged media flow 402 between the client terminals 302, 304. The other communication component(s), for example, may have more bandwidth availability than the communication component 308. Thus, the quality manager 322 can push the reconfigured routing path out to the appropriate communication components, which can then route the tagged media flow 402 according to the reconfigured routing path. In at least some embodiments, the reconfigured routing path may circumvent the communication component 308, and thus avoid flow problems that may be introduced by the communication component 308.

Having discussed some example implementation scenarios, consider now a discussion of some example procedures in accordance with one or more embodiments.

Example Procedures

The following discussion describes some example procedures for service policies for communication sessions in accordance with one or more embodiments. The example procedures may be employed in the environment 100 of FIG. 1, the system 1000 of FIG. 10, and/or any other suitable environment. In at least some embodiments, the steps described for the various procedures can be implemented automatically and independent of user interaction.

Figure 6:
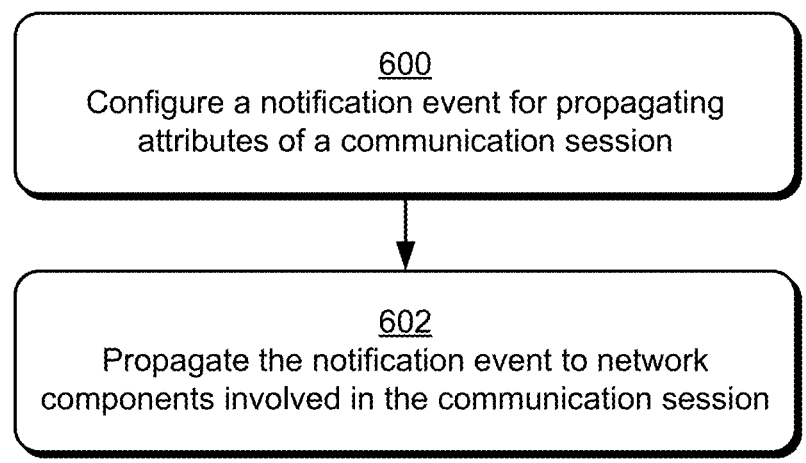
FIG. 6 is a flow diagram that describes steps in a method in accordance with one or more embodiments.
Figure 7:
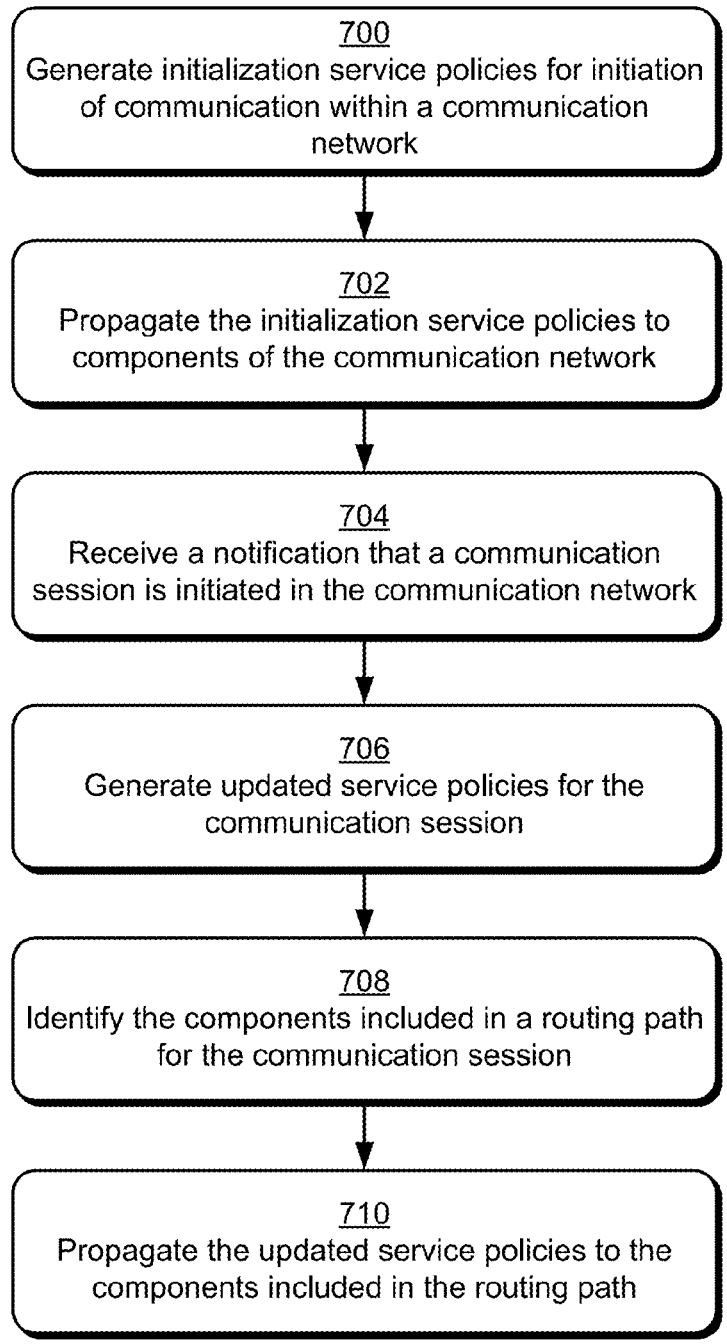
FIG. 7 is a flow diagram that describes steps in a method in accordance with one or more embodiments.

FIG. 6 is a flow diagram that describes steps in a method in accordance with one or more embodiments. The method describes an example way for enlightening various network components with service policies for handling communication session data in accordance with one or more embodiments.

Step 600 configures a notification event for propagating attributes of a communication session. The notification event, for instance, can be configured using an application programming interface (API) that can be leveraged to configure and communicate session information to various network components involved in a communication session. For example, the API can identify dialogue events and session events for which attributes of a communication session can be identified. Consider, for instance, the following events and attributes that may be conveyed via a notification event generated by the API:

Dialogue Events—

These events apply to various portions of a communication session, such as the start, update, and end of a communication session. A dialogue event can include one or more of the following example attributes.

(1) Timestamp: This attribute can be leveraged to specify timestamps for a start of a communication session, updates that occur during a communication session, and an end (e.g., termination) of a communication session.

(2) Source IP Address: This attribute can be leveraged to specify an IP address for a device that is a source of media during a communication session, e.g., a device that initiates a communication session.

(3) Destination IP Address: This attribute can be leveraged to specify an IP address for a device that is to receive media as part of a communication session.

(4) Transport Type: This attribute can be leveraged to specify a transport type or combination of transport types for a communication session. Examples of transport types include Transmission Control Protocol (TCP), User Datagram Protocol (UDP), and so forth.

(5) Source Port: this attribute can be leveraged to specify an identifier for a port at a source device, e.g., a source device identified by the Source IP Address referenced above.

(6) Destination Port: This attribute can be leveraged to specify an identifier for a port at a destination device, e.g., a destination device identified by the Destination IP Address referenced above.

(7) Media Type: This attribute can be leveraged to specify a media type and/or types that are to be transmitted and/or are being transmitted as part of a communication session. As discussed elsewhere herein, the communication session can involve multiple different types of media. Thus, the Media Type attribute can be employed to identify media types in a communication session, such as for applying the service policies discussed herein.

(8) Bandwidth Estimation: This attribute can be leveraged to specify an estimated bandwidth that is to be allocated for a communication session. The estimated bandwidth, for instance, can be based on various factors, such as a privilege level associated with a user, type and/or types of media included in a communication session, and so forth.

(9) To: This attribute can be leveraged to identify a user to which media in a communication session is to be transmitted.

(10) From: This attribute can be leveraged to identify a user from which media and a communication session is transmitted.

(11) Error Code: This attribute can be leveraged to specify various error codes for pairs that may occur as part of a communication session. For example, errors can include errors that occur during initiation the communication session, errors that occurred during a communication session, errors that occur when a communication session is terminated, and so forth.

Session Problem Events—

These events can be generated and applied when a communication session experiences errors, performance degradation, and so forth. A session problem event may include one or more of the attributes discussed above with reference to Dialogue Events, and may also include one or more of the following attributes.

(1) Mean Opinion Score (MOS) Degradation: This attribute can be leveraged to specify a MOS for a communication session. The attribute, for instance, can be used to indicate that an overall quality of a communication session has decreased.

(2) Jitter Inter-Arrival Time: This attribute can be leveraged to specify jitter values for a communication session. The attribute, for instance, can be used to indicate that a jitter value or values have increased, e.g., have exceeded a specified jitter value threshold.

(3) Packet Loss Rate: This attribute can be leveraged to specify a packet loss rate for a communication session. The attribute, for instance, can be used to indicate that a packet loss rate has increased, e.g., has exceeded a specified packet loss rate value threshold.

(4) Round Trip Delay (RTD): This attribute can be leveraged to specify RTD values for packets in communication sessions. The attribute, for instance, can be used to indicate that RTD values for packets have increased, e.g., have exceeded a specified RTD value threshold.

(5) Concealment Ratio: This attribute can be leveraged to specify a cumulative ratio of concealment time over speech time observed after starting a communication session. The attribute, for instance, can be used to specify that a concealment ratio has increased, e.g., has exceeded a specified concealment ratio value threshold.

Step 602 propagates the notification event to network components involved in the communication session. The quality manager 112, for example, can configure the notification event with various attributes discussed above, such as for communicating Dialogue Events and/or Session Problem Events. The notification event, for instance, can include attribute values for various attributes for service policies, and can be used to propagate the service policies as discussed herein. The quality manager 112 can propagate the notification event to the network components 110 to enable the network components 110 to apply associated service policies to a communication session. In at least some embodiments, the procedure described above can be employed to propagate service policies to various network components, and/or to initiate remedial procedures for problems that may occur during a communication session.

According to various embodiments, notification events can be configured to propagate (e.g., via the API discussed above) different types of service policies to network components. For instance, consider the following example procedure.

Step 700 generates initialization service policies for initiation of communication within a communication network. The initialization service policies, for instance, can specify default service priority designations for specific types of communication data. As discussed above, the initialization service policies can specify that signaling to initiate a communication session is to be tagged with a high (e.g., preferred) service priority. The initialization service policies can further specify that media data is to be tagged or retagged as a lower service priority, such as BE service priority. Still further, the initialization service policies can specify bandwidth allocations for different service priorities for data in the communication network. The initialization service policies can specify other rules and actions not specifically discussed herein for data in a communication network.

Step 702 propagates the initialization service policies to components of the communication network. For example, with reference to the environment 100 discussed above, the quality manager 112 can propagate the initialization service policies to the communication components 110. According to various embodiments, this causes the components to be configured with the initialization service policies such that the components can apply the initialization service policies to communication data.

Step 704 receives a notification that a communication session is initiated in the communication network. The notification, for example, includes attributes of the communication session, such as identifiers for client devices involved in the session, types of media involved, and so forth. As an example, consider the notification 320 discussed above with reference to FIG. 3. The notification 320 includes 5-tuple information which can be used to identify a specific communication session, e.g., to differentiate the communication session from other communication sessions. In at least some embodiments, the notification includes an indication that the communication session is authorized within the communication network, e.g., is from an authenticated user. The notification, for example, can include a security key, a hash value, an authentication factor and/or mechanism, indicating that the notification is from an authenticated source that is authorized to issue such notifications.

Step 706 generates updated service policies for the communication session. The updated service policies, for example, specify a new service priority designation for data of the communication session. For instance, the updated service policies specify that media data for the communication session is to be tagged with a higher service priority, such as EF. The updated service policies may include other types of information, such as updated bandwidth allocations, updated routing paths, and so forth. For example, the updated service policies can include different bandwidth allocations for different service priority, different media types, and so forth.

As referenced above, the updated service policies can be specific to the communication session. For instance, the updated service policies include an identifier for the communication session, e.g., 5-tuple information for the session. Thus, in at least some embodiments the updated service policies are to be applied to the communication session and not to other communication sessions.

Step 708 identifies the components included in a routing path for the communication session. The quality manager discussed above, for example, can identify the various components (e.g., routers, switches, and so forth) that make up the routing path.

Step 710 propagates the updated service policies to the components included in the routing path. The quality manager, for instance, transmits the updated service policies to the components identified as being in the routing path. As referenced above, service policies can be transmitted to various components separately from a communication session, e.g., as an out-of-band data transmission. The components can be reconfigured based on the updated service policies, and can apply the updated service policies to the communication session. The updated service policies, for example, can replace and/or override some or all of the initialization service policies, and thus can be applied in place of at least some of the initialization service policies.

According to various implementations, service policies for a communication session are removed when the communication session terminates and/or expires. For instance consider the following example procedure.

Figure 8:
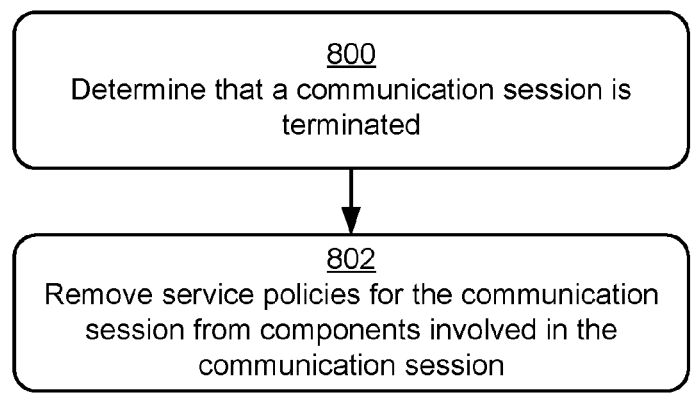
FIG. 8 is a flow diagram that describes steps in a method in accordance with one or more embodiments.

FIG. 8 is a flow diagram that describes steps in a method in accordance with one or more embodiments. Step 800 determines that a communication session is terminated. For instance, a session termination event can be received indicating that a communication session has been closed. Alternatively or additionally, a notification can be received that the communication session has aged out, e.g., that no communication data has been exchanged in the communication session for a specified period of time.

Step 802 removes service policies for the communication session from components involved in the communication session. The components, for example, can be notified that the communication session has been terminated and that any service policies for the communication session are to be removed. Alternatively or additionally, an aging function can be invoked that specifies that since no data packets have been exchanged in the communication session for a specified period of time, service policies for the communication session are to be removed.

Thus, techniques discussed herein enable service policies to be generated and updated dynamically on a per-session basis. Further, service policies for a particular communication session are removed upon termination and/or expiration of the communication session.

In at least some embodiments, techniques discussed herein can be employed to remedy problems that may occur during a communication session. For instance, consider the follow example procedure.

Figure 9:
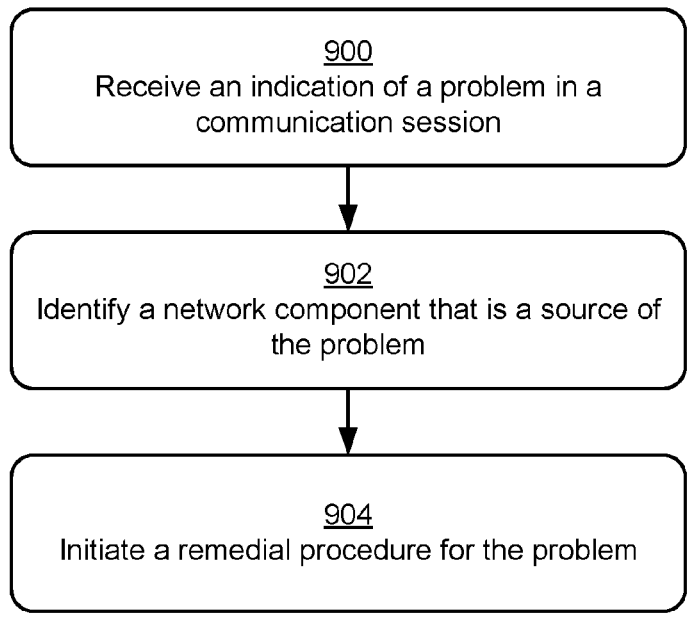
FIG. 9 is a flow diagram that describes steps in a method in accordance with one or more embodiments.

FIG. 9 is a flow diagram that describes steps in a method in accordance with one or more embodiments. Step 900 receives an indication of a problem in a communication session. The quality manager discussed above, for example, can receive an indication of a problem with a media data flow, such as dropped packets, excess jitter and/or packet delay, and so forth.

Step 902 identifies a network component that is a source of the problem. For instance, the quality manager determines that packet throughput at a particular communication component is insufficient, e.g., that a packet ingress rate at the component is significantly higher than a packet egress rate such that packets are being dropped at the component, excess jitter and/or delay is occurring at the component, and so forth.

The quality manager may also determine that one or more settings of the network component are causing the problem.

For instance, a bandwidth allocation for the communication session may be insufficient to handle data traffic through the component. As reference above, the bandwidth allocation may refer to bandwidth allocation for the particular service priority for the communication session, for the media type or types for the communication session, and so forth.

Step 904 initiates a remedial procedure for the problem. The quality manager, for example, can notify the identified network component that bandwidth allocation for the communication session is insufficient. In response, the network component can allocate additional bandwidth to the communication session. For instance, the network component can allocate additional bandwidth to a service priority designated for the communication session, and/or for a media type or types associated with the communication session.

Alternatively or additionally, the quality manager can remap a routing path for the communication session. For instance, the quality manager can generate a routing path that circumvents the network component that is the source of the problem. The quality manager can propagate the remapped routing path to one or more entities involved in the communication session, such as client terminals that are communicating via the communication session, a communication service that initiates and/or mediates the communication session, intermediary network components involved in routing the communication session, and so forth. Thus, the remapped routing path can be applied such that the communication session avoids the network component that is the source of the problem.

Having discussed some example procedures, consider now a discussion of an example system and device in accordance with one or more embodiments.

Example System and Device

Figure 10:
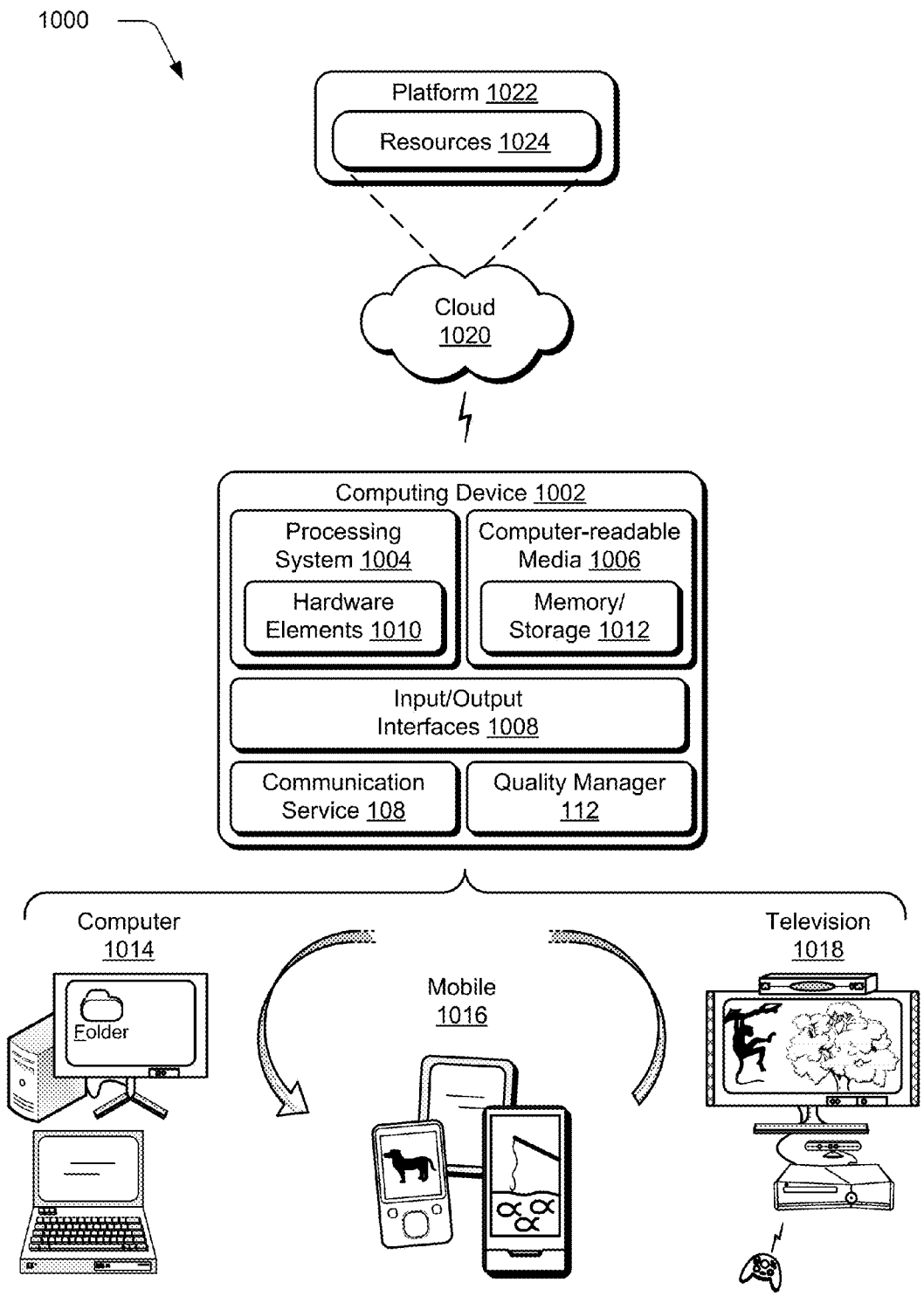
FIG. 10 illustrates an example system and computing device as described with reference to FIG. 1, which are configured to implement embodiments of techniques described herein.

FIG. 10 illustrates an example system generally at 1000 that includes an example computing device 1002 that is representative of one or more computing systems and/or devices that may implement various techniques described herein. For example, the client terminals 104 discussed above with reference to FIG. 1 can be embodied as the computing device 1002. The computing device 1002 may be, for example, a server of a service provider, a device associated with the client (e.g., a client device), an on-chip system, and/or any other suitable computing device or computing system.

The example computing device 1002 as illustrated includes a processing system 1004, one or more computer-readable media 1006, and one or more Input/Output (I/O) Interfaces 1008 that are communicatively coupled, one to another. Although not shown, the computing device 1002 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware element 1010 that may be configured as processors, functional blocks, and so forth. This may include implementation in hardware as an application specific integrated circuit or other logic device formed using one or more semiconductors. The hardware elements 1010 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 1006 is illustrated as including memory/storage 1012. The memory/storage 1012 represents memory/storage capacity associated with one or more computer-readable media. The memory/storage 1012 may include volatile media (such as random access memory (RAM)) and/or nonvolatile media (such as read only memory (ROM), Flash memory, optical disks, magnetic disks, and so forth). The memory/storage 1012 may include fixed media (e.g., RAM, ROM, a fixed hard drive, and so on) as well as removable media (e.g., Flash memory, a removable hard drive, an optical disc, and so forth). The computer-readable media 1006 may be configured in a variety of other ways as further described below.

Input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone (e.g., for voice recognition and/or spoken input), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 1002 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1002. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Computer-readable storage media do not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1002, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media.

As previously described, hardware elements 1010 and computer-readable media 1006 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 1010. The computing device 1002 may be configured to implement particular instructions and/or functions corresponding to the software and/or hardware modules. Accordingly, implementation of modules that are executable by the computing device 1002 as software may be achieved at least partially in hardware, e.g., through use of computer-readable storage media and/or hardware elements 1010 of the processing system. The instructions and/or functions may be executable/operable by one or more articles of manufacture (for example, one or more computing devices 1002 and/or processing systems 1004) to implement techniques, modules, and examples described herein.

As further illustrated in FIG. 10, the example system 1000 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 1000, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 1002 may assume a variety of different configurations, such as for computer 1014, mobile 1016, and television 1018 uses. Each of these configurations includes devices that may have generally different constructs and capabilities, and thus the computing device 1002 may be configured according to one or more of the different device classes. For instance, the computing device 1002 may be implemented as the computer 1014 class of a device that includes a personal computer, desktop computer, a multi-screen computer, laptop computer, netbook, and so on.

The computing device 1002 may also be implemented as the mobile 1016 class of device that includes mobile devices, such as a mobile phone, portable music player, portable gaming device, a tablet computer, a multi-screen computer, and so on. The computing device 1002 may also be implemented as the television 1018 class of device that includes devices having or connected to generally larger screens in casual viewing environments. These devices include televisions, set-top boxes, gaming consoles, and so on.

The techniques described herein may be supported by these various configurations of the computing device 1002 and are not limited to the specific examples of the techniques described herein. For example, functionalities discussed with reference to the communication service 108 and/or the quality manager 112 may be implemented all or in part through use of a distributed system, such as over a "cloud" 1020 via a platform 1022 as described below.

The cloud 1020 includes and/or is representative of a platform 1022 for resources 1024. The platform 1022 abstracts underlying functionality of hardware (e.g., servers) and software resources of the cloud 1020. The resources 1024 may include applications and/or data that can be utilized while computer processing is executed on servers that are remote from the computing device 1002. Resources 1024 can also include services provided over the Internet and/or through a subscriber network, such as a cellular or Wi-Fi network.

The platform 1022 may abstract resources and functions to connect the computing device 1002 with other computing devices. The platform 1022 may also serve to abstract scaling of resources to provide a corresponding level of scale to encountered demand for the resources 1024 that are implemented via the platform 1022. Accordingly, in an interconnected device embodiment, implementation of functionality described herein may be distributed throughout the system 1000. For example, the functionality may be implemented in part on the computing device 1002 as well as via the platform 1022 that abstracts the functionality of the cloud 1020.

Discussed herein are a number of methods that may be implemented to perform techniques discussed herein. Aspects of the methods may be implemented in hardware, firmware, or software, or a combination thereof. The methods are shown as a set of steps that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100.

CONCLUSION

Techniques for service policies for communication sessions are described. Although embodiments are described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. A system comprising:
   at least one processor; and
   one or more memories including instructions stored thereon that, responsive to execution by the at least one processor, cause the system perform operations including:
   generating an initialization service policy for initiation of communication sessions within a communication network, and propagating the initialization service policy to one or more components of the communication network, the initialization service policy specifying that a media flow of a communication session is to be tagged with a first service priority designator;
   receiving a notification that a communication session is initiated in the communication network; and
   generating in response to the notification an updated service policy for the communication session and propagating the updated service policy to the one or more components to be applied to the communication session in place of the initialization service policy, the updated service policy being implemented as data including a session identifier for the communication session, being propagated separate from a media flow of the communication session, and specifying that a media flow of the communication session is to be retagged with a second service priority designator.

2. A system as recited in claim 1, wherein the communication session comprises at least one of a Voice over Internet Protocol (VoIP) communication, a video communication, a text messaging communication, or a file transfer.

3. A system as recited in claim 1, wherein the initialization service policy specifies that media data for communication sessions in the communication network is to be tagged or retagged as best effort service priority.

4. A system as recited in claim 1, wherein the initialization service policy specifies a first service priority to be applied to media of the communication session when the communication session is initiated in the communication network, and wherein the updated service policy specifies a second, different service priority to be applied to the media after initiation of the communication session in the communication network.

5. A system as recited in claim 1, wherein the initialization service policy specifies that media of the communication session is to be tagged as a best effort service priority, and wherein the updated service policy specifies that the media is to be tagged with a higher service priority than best effort.

6. A system as recited in claim 1, wherein the initialization service policy specifies a bandwidth allocation for communication sessions within the communication network, the bandwidth allocation being based on at least one of a service priority for a communication session or a type of media included in a communication session.

7. A system as recited in claim 6, wherein the updated service policy includes an updated bandwidth allocation to be applied to the communication session within the communication network.

8. A system as recited in claim 1, wherein the initialization service policy is propagated to the one or more components of the communication network separately from data of the communication session.

9. A system as recited in claim 1, wherein the updated service policy is specific to the communication session and identifies one or more client terminals involved in the communication session.

10. A system as recited in claim 1, wherein the operations further comprise:
    determining that the communication session is terminated; and
    in response to said determining, causing the updated service policy to be removed from the one or more components.

11. A system as recited in claim 1, wherein the operations further comprise:
    receiving an indication of a problem in a communication session; and
    initiating a remedial procedure for the problem including at least one of reallocating bandwidth for the communication session, or remapping a routing path for the communication session in the communication network.

12. A computer-implemented method, comprising:
    receiving a notification that a communication session is initiated in a communication network;
    generating an updated service policy for the communication session that is implemented as data that includes a session identifier for the communication session and an updated service priority designator to be applied to the communication session in place of a previous service priority designator for the communication session; and
    propagating, separately from a media flow of the communication session, the updated service policy to one or more components in a routing path for the communication session in the communication network, the updated service policy specifying that the media flow of the communication session is to be tagged with the updated service priority designator.

13. A method as described in claim 12, wherein said propagating comprises propagating the updated service policy to the one or more components separately from data of the communication session.

14. A method as described in claim 12, wherein the updated service policy is specific to the communication session and identifies two or more client terminals involved in the communication session.

15. A method as described in claim 12, wherein the previous service priority designator specifies best effort service priority, and the updated service priority designator is a higher priority service priority than best effort.

16. A method as described in claim 12, wherein the updated service policy is dynamically generated for the communication session and is removed from the one or more components in response to termination of the communication session.

17. A method as described in claim 12, wherein data of the communication session is encrypted, and wherein the updated service policy enables the updated service priority designator to be applied to the communication session without requiring decryption of the data of the communication session.

18. A computer-implemented method, comprising:
   generating an initialization service policy for initiation of communication sessions within a communication network, the initialization service policy specifying that the media flow of the communication session is to be tagged with a first service priority designator;
   propagating the initialization service policy to one or more components of the communication network;
   receiving a notification that a communication session is initiated in the communication network; and
   generating in response to the notification an updated service policy for the communication session and propagating the updated service policy to the one or more components to be applied to the communication session in place of the initialization service policy, the updated service policy being implemented as data including a session identifier for the communication session and being propagated to the one or more components of the communication network separate from a media flow of the communication session, the updated service policy specifying that the media flow of the communication session is to be retagged with a second service priority designator.

19. A method as described in claim 18, further comprising:
   determining that the communication session is terminated; and
   in response to said determining, causing the updated service policy to be removed from the one or more components.

20. A method as described in claim 18, wherein the second service priority designator is a higher service priority than the first service priority designator.

* * * * *